United States Patent
Deshpande et al.

(10) Patent No.: US 9,665,518 B2
(45) Date of Patent: May 30, 2017

(54) METHODS AND SYSTEMS FOR CONTROLLING ORDERED WRITE TRANSACTIONS TO MULTIPLE DEVICES USING SWITCH POINT NETWORKS

(71) Applicants: Sanjay R. Deshpande, Austin, TX (US); Mark A. Banse, Austin, TX (US); John E. Larson, Round Rock, TX (US); Fernando A. Morales, Austin, TX (US); Thang Q. Nguyen, Austin, TX (US)

(72) Inventors: Sanjay R. Deshpande, Austin, TX (US); Mark A. Banse, Austin, TX (US); John E. Larson, Round Rock, TX (US); Fernando A. Morales, Austin, TX (US); Thang Q. Nguyen, Austin, TX (US)

(73) Assignee: NXP USA, Inc., Austin, TX (US)

( * ) Notice: Subject to any disclaimer, the term of this patent is extended or adjusted under 35 U.S.C. 154(b) by 367 days.

(21) Appl. No.: 14/495,096

(22) Filed: Sep. 24, 2014

(65) Prior Publication Data

US 2016/0085706 A1    Mar. 24, 2016

(51) Int. Cl.
| | |
|---|---|
| *G06F 13/00* | (2006.01) |
| *G06F 13/36* | (2006.01) |
| *G06F 13/40* | (2006.01) |
| *G06F 13/16* | (2006.01) |

(52) U.S. Cl.
CPC ...... *G06F 13/4022* (2013.01); *G06F 13/1621* (2013.01)

(58) Field of Classification Search
None
See application file for complete search history.

(56) References Cited

U.S. PATENT DOCUMENTS 9,495,290 B2 * 11/2016 Wingard ............. G06F 12/0607
2013/0326522 A1    12/2013 Mangano et al.

OTHER PUBLICATIONS

LogiCORE IP AXI Interconnect DS768; Dec. 18, 2012; Xilinx Inc.; v1.06.a; 1-62.*
Lecture 21: Coherence and Interconnection Networks, ISCA, 26 pgs. (2006).
AXI Referenced Guide, UG761, V. 13.4, 120 pgs. (Jan. 18, 2012).
AMBA Network Interconnect (NIC-301), Technical Reference Manual, Revision R2P1, 54 pgs. (2010).

* cited by examiner

*Primary Examiner* — Idriss N Alrobaye
*Assistant Examiner* — Richard B Franklin

(57) ABSTRACT

Ordered write transactions from requester devices to multiple target devices are controlled using switch point networks. The requester device and the multiple target devices for the write transactions are coupled to a network of interconnected switch points. Write requests are generated for a plurality of parcels associated with a block of data to be written. The write requests have a particular order associated with an order in which the parcels are to be written, and these write requests are provided to the switch point interconnection network in the particular order. At least one of the switch points is then used to control the flow of write requests to the multiple target devices such that the particular order is maintained. In one embodiment, the target devices are memory devices, and the particular order is based upon the AXI (Advanced eXtensible Interface) protocol.

24 Claims, 5 Drawing Sheets

METHODS AND SYSTEMS FOR CONTROLLING ORDERED WRITE TRANSACTIONS TO MULTIPLE DEVICES USING SWITCH POINT NETWORKS

TECHNICAL FIELD

This technical field relates to write transactions for devices operating in a producer-consumer environment and to write transactions for interleaved target devices.

BACKGROUND

Certain systems use shared resources such as shared memory and have processing nodes that operate according to a producer-consumer model where data is produced by one processing node and consumed by another processing node using shared resources. Further, write transactions to such shared resources can be ordered such that certain transactions are required to occur before other transactions.

The AXI (Advanced eXtensible Interface) protocol developed by ARM is an interconnected bus specification that in part uses ordered write transactions to shared resources to implement a producer-consumer model. When devices are connected to communicate through an AXI interconnection, these devices are required to satisfy specific AXI ordering rules in order to meet AXI protocol requirements when a write transaction occurs through the AXI interconnection from an AXI requester node to an AXI target node. For example, AXI ordering rules in part require that transactions carrying the same AXI identifier (AXI-ID) from an AXI requester to the same destination AXI target must occur in order, that transactions with the same AXI-ID from an AXI requester to a different destination AXI target must occur in order, that transactions with different AXI-IDs from an AXI requester to destination AXI targets can occur in any order, and that AXI non-buffered write transactions must wait for all previous AXI buffered write transactions with the same AXI-ID to complete.

Typically, each AXI requester takes on the responsibility for adhering to the AXI ordering requirements. For example, for producer-consumer behavior to work correctly under AXI ordering rules, the buffered writes with a given AXI-ID are required to complete in a particular write order. In this behavior, buffered writes for data are followed by a buffered write of a completion flag or a MSI buffered write with the same AXI-ID. These AXI buffered writes may also go to distinct targets within the interconnection requiring AXI write ordering. Typically, the AXI write ordering has been performed at an AXI entry logic block within the requester by stalling writes into the AXI interconnection to a new destination target until all previously issued writes to an old destination target have completed. This prior method, however, has produced large latencies, reduced bandwidth, and large buffering structures at the AXI entry logic block for AXI requesters.

Further, the stream of buffered writes from an AXI requester node, such as an input-output (IO) requester, may be interleaved such that they access multiple target devices, such as memory devices and/or other target devices. In this case, significant processing overhead and latency is required of the requester node to make sure that the stream of buffered AXI writes complete in the proper order as the requester node is responsible for adhering to the AXI ordering requirements.

DESCRIPTION OF THE DRAWINGS

It is noted that the appended figures illustrate only example embodiments and are, therefore, not to be considered as limiting the scope of the present invention. Elements in the figures are illustrated for simplicity and clarity and have not necessarily been drawn to scale.

DETAILED DESCRIPTION

Methods and systems are disclosed for controlling ordered write transactions from a requester device to multiple target devices using switch point networks. For the disclosed embodiments, the requester device and the multiple target devices are coupled to a network of interconnected switch points. Write requests are generated for a plurality of parcels associated with a block of data to be written from the requester device to the multiple target device. The write requests have a particular order associated with an order in which the parcels are to be written to the multiple target devices, and these write requests are provided to the network of interconnected switch points in the particular order. The network of interconnected switch points then controls the flow of write requests to the multiple target devices using at least one of the switch points such that the particular order is maintained. This write request/response flow control by the network of interconnected switch points effectively reduces complexity and buffering that would be otherwise required for the requester device to maintain the particular order for the write requests. Different features and variations can be implemented, as desired, and related or modified systems and methods can be utilized, as well.

With respect to AXI (Advanced eXtensible Interface) ordering rules, the disclosed embodiments allow for these AXI ordering rules to be maintained by a switch point interconnection network without requiring additional processing overhead or buffering at the requester node. In contrast with prior solutions, the disclosed embodiments implement handling the AXI ordering rules within the interconnection at a destination target bifurcation point resulting in lower latencies, increased bandwidth, and low buffering overhead. As such, adherence to the AXI ordering rules is provided for by the switch point interconnect network itself thereby reducing buffering, reducing complexities, and lowering latencies at the requestor nodes. For example, producer-consumer behavior, such as sequential consistency between data writes and flag writes to various target devices (e.g., interleaved memory devices) within an AXI interconnection can be completed in order using switch points within a switch point interconnect network to control ordering without breaking producer-consumer consistency rules. The disclosed embodiments thereby allow for the pipelining of buffered writes while providing in-order operation that satisfies producer-consumer ordering rules for the AXI protocol and/or other similar producer-consumer related interconnection protocols.

Figure 1:
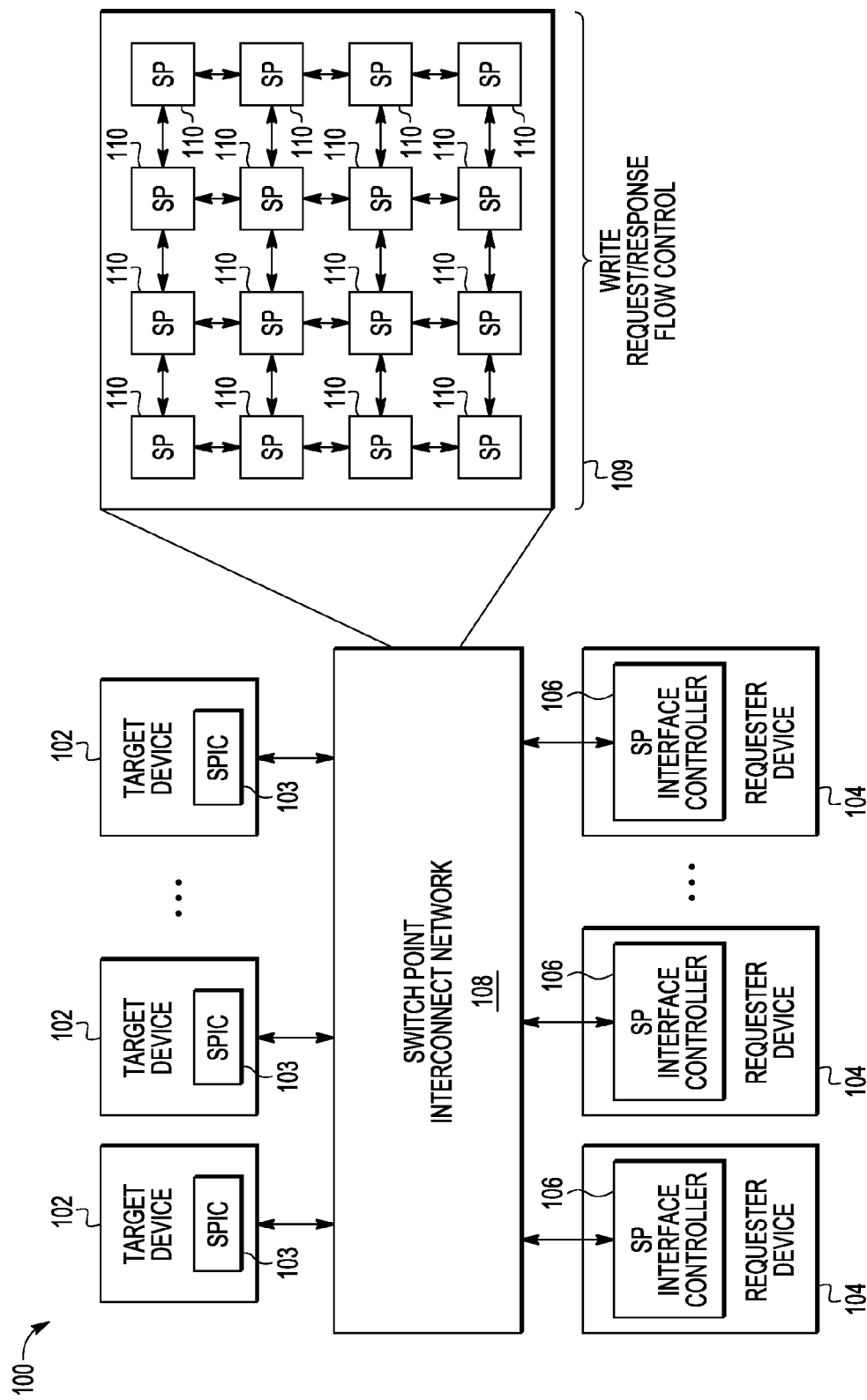
FIG. 1 is a block diagram of an example embodiment for a producer-consumer interconnection environment including a plurality of target devices and a plurality of requester devices connected to a switch point interconnect network.

FIG. 1 is a block diagram of an example embodiment 100 for a producer-consumer interconnection environment including a plurality of target devices 102 and a plurality of requester devices 104 connected to a switch point interconnect network 108. Each requester device 104 includes a switch point (SP) interface controller 106 that is configured in part to control write requests for write transactions with the target devices 102 through the switch point interconnect network 108. Similarly, each target device 102 includes a switch point interface controller (SPIC) 103 that is configured in part to control write completion responses for write transactions with requester devices 104 through the switch point interconnect network 108. The write transactions include write transactions that address multiple target devices 104, such as interleaved memory devices.

As described in more detail below and as indicated by bracket 109, the interconnected switch points (SP) 110 within the switch point interconnect network 108 control the flow of write requests for the write transactions in order to satisfy ordering rule requirements thereby removing complexity, latency, and buffering requirements from the requester devices 104. For a given write transaction including two target devices 102, one of the switch points 110 becomes a controlling switch point (CSP) that controls the flow of write requests to the different target devices 102. Two of the switch points 110 are directly connected to the requester device 104 and the target devices 102, respectively. Further additional ones of the switch points 110 can be intermediate switch points (ISPs) that forward write requests and completion responses to adjacent switching points 110 within the switch point interconnect network 108. Although sixteen (16) switch points 110 are shown for embodiment 100, any number of switch points 110 could be used for the switch point interconnect network. Further, while the switch points 110 are shown as being interconnected to adjacent switch points 110 in rows and columns, other interconnection topologies between switch points could also be utilized (e.g., star topology, ring topology, etc.). Other variations could also be implemented while still taking advantage of the techniques described herein that utilize a network of interconnected switch points to provide order management for write transactions to multiple interleaved target devices.

The requester devices 104 be configured to perform input/output (IO), processing, and/or other desired functions within an overall system or integrated circuit. The target devices 102 represent shared resources, such as memory devices and/or other computing resources that are used by the requester devices 104. In certain embodiments, the target SPICs 103 and the requester SPICs 106 are configured to operate according to AXI interconnection protocols, and the switch point interconnect network 108 is configured to implement AXI ordering rules for write transactions between the requester devices 104 and the target devices 102. In particular, the switch point interconnect network 108 takes responsibility for adhering to the AXI ordering rules so that the requester devices 104 are not required to use their own processing overhead and/or buffer storage to implement the AXI ordering rules. As such, latency and complexity for the requester devices 104 is greatly reduced, particularly for write transactions that address multiple target devices 102, such as interleaved memory devices.

Figure 2A:
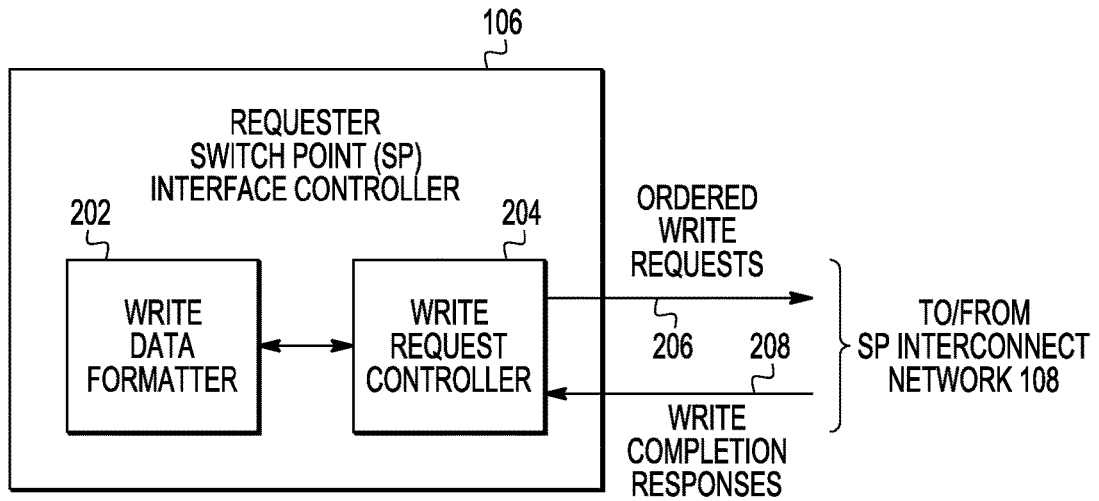
FIG. 2A is a block diagram of an example embodiment for a switch point interface controller for a requester device that includes a write data formatter and a write request controller.

FIG. 2A is a block diagram of an example embodiment for a switch point (SP) interface controller 106 for a requester device 104 that includes a write data formatter 202 and a write request controller 204. The write data formatter 202 is configured to format the data to be written to the target devices 102. As further described below, the write data formatter 202 can be configured to format the data for buffered writes, non-buffered writes, and/or for other write transactions that are communicated through the SP interconnect network 108. The write request controller 204 communicates with the write data formatter 202 and in part provides ordered write requests 206 to the SP interconnect network 108. In particular, the requester SP interface controller 106 is connected to one of the switch points 110 and sends the ordered write requests to this requester switch point (RSP). As further described below, this requester switch point (RSP) in turn forwards the ordered write requests to a controlling switch point (CSP) that controls the flow of the write requests to the target devices. When the ordered write requests have completed, write completion responses 208 are received through the SP interconnect network 108 and sent back the to the write request controller 204. The write request controller 204 can then determine if the ordered write requests have all completed successfully.

Figure 2B:
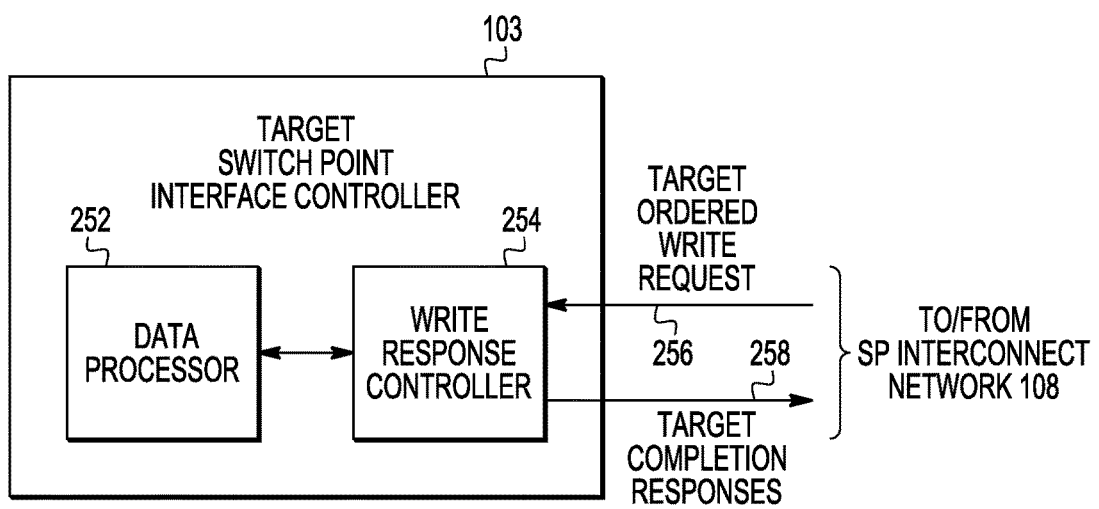
FIG. 2B is a block diagram of an example embodiment for a switch point interface controller for a target device that includes a data processor and a write response controller.

FIG. 2B is a block diagram of an example embodiment for a switch point (SP) interface controller 103 for a target device that includes a data processor 252 and a write response controller 254. The data processor 252 is configured to process the data within the write requests as needed so that it can be written by the target device 102. The write response controller 254 receives the ordered write requests 256 for the target device 102 and communicates with the data processor 252 to provide data to be written from these write requests 256. Once the write requests 256 are completed by the target device 102, the write response controller 254 sends write completion responses for the target device 102 into the SP interconnect network 108. In particular, the target SP interface controller 103 is connected to one of the switch points 110 and sends the write completion responses to this target switch point (TSP). This target switch point (TSP) in turn forwards the write completion responses back to the original requester device 104. The return path taken for a completion response through the switch point interconnection network 108 follows in reverse sequence from the path for the write request associated with the completion response. This return path will cause the write response to travel back through the controlling switch point (CSP) on the way to the requester device 104. As described further below, where write requests are directed to multiple target devices 102, the controlling switch point (CSP) holds write requests to non-current target devices 102, will monitor write responses to identify the last write response from the current target device 102, and then allow other write requests to advance to a different target device 102.

Figure 3:
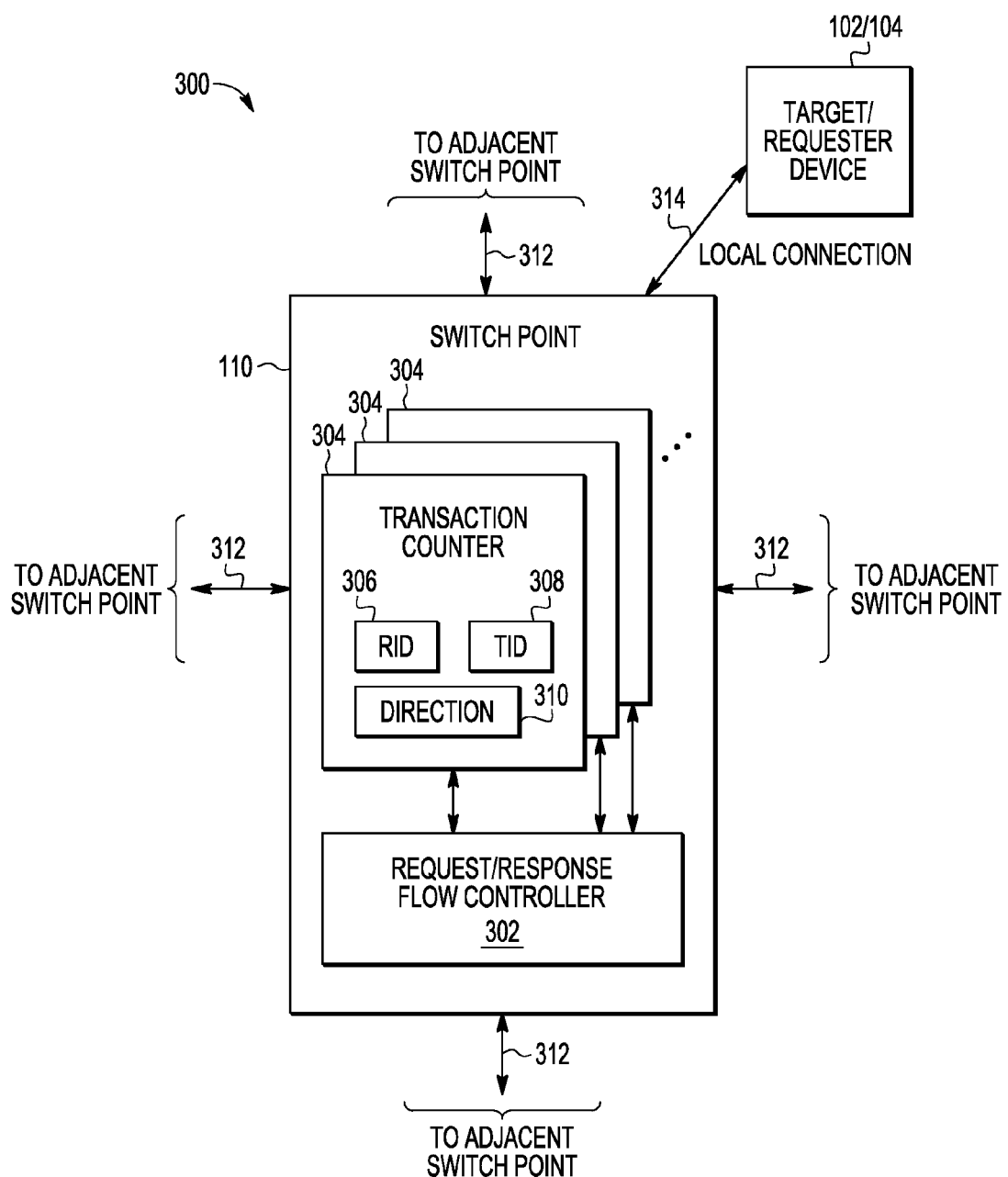
FIG. 3 is a block diagram of an example embodiment for a switch point that includes a request/response flow controller and one or more transaction counters.

FIG. 3 is a block diagram of an example embodiment for a switch point 110 that includes a request/response flow controller 302 and one or more transaction counters 304. The switch point 110 has one or more connections 312 to adjacent switch points 110 within the switch point interconnect network 108. The switch point 110 can also have one or more local connections 314 to one or more target devices 102 and one or more requester devices 104 that are serviced by the switch point 110. The switch point 110 can also have no local connections 314 if no target devices or requester devices are connected to that particular switch point 110. Depending upon where the switch point 110 is within the SP interconnect network 108, the request/response flow controller 302 within the switch point 110 will communicate write requests/responses with requester devices 104 if the switch point 110 is a requester switch point (RSP) connected to a requester device 104, will control the flow of requests within the SP interconnect network 108 if the switch point 110 is acting as the controlling switch point (CSP) as described further below, will forward the write requests/responses to adjacent switch points if the switch point 110 is within the communication path between a requester device 104 and a target device 102, and/or will communicate write requests/responses with a target devices 102 if the switch point 110 is a target switch point (TSP) connected to a target device 102. The switch point 110 also includes a transaction counter 304 for each active write transaction that keeps track of the requester identifier (RID) 306, the transaction identifier (TID) 308 such as the AXI-ID, and the flow direction 310 for the write request or write completion response. As indicated above, each write transaction can include a plurality of ordered write requests that are addressed to multiple target devices 102.

Figure 4:
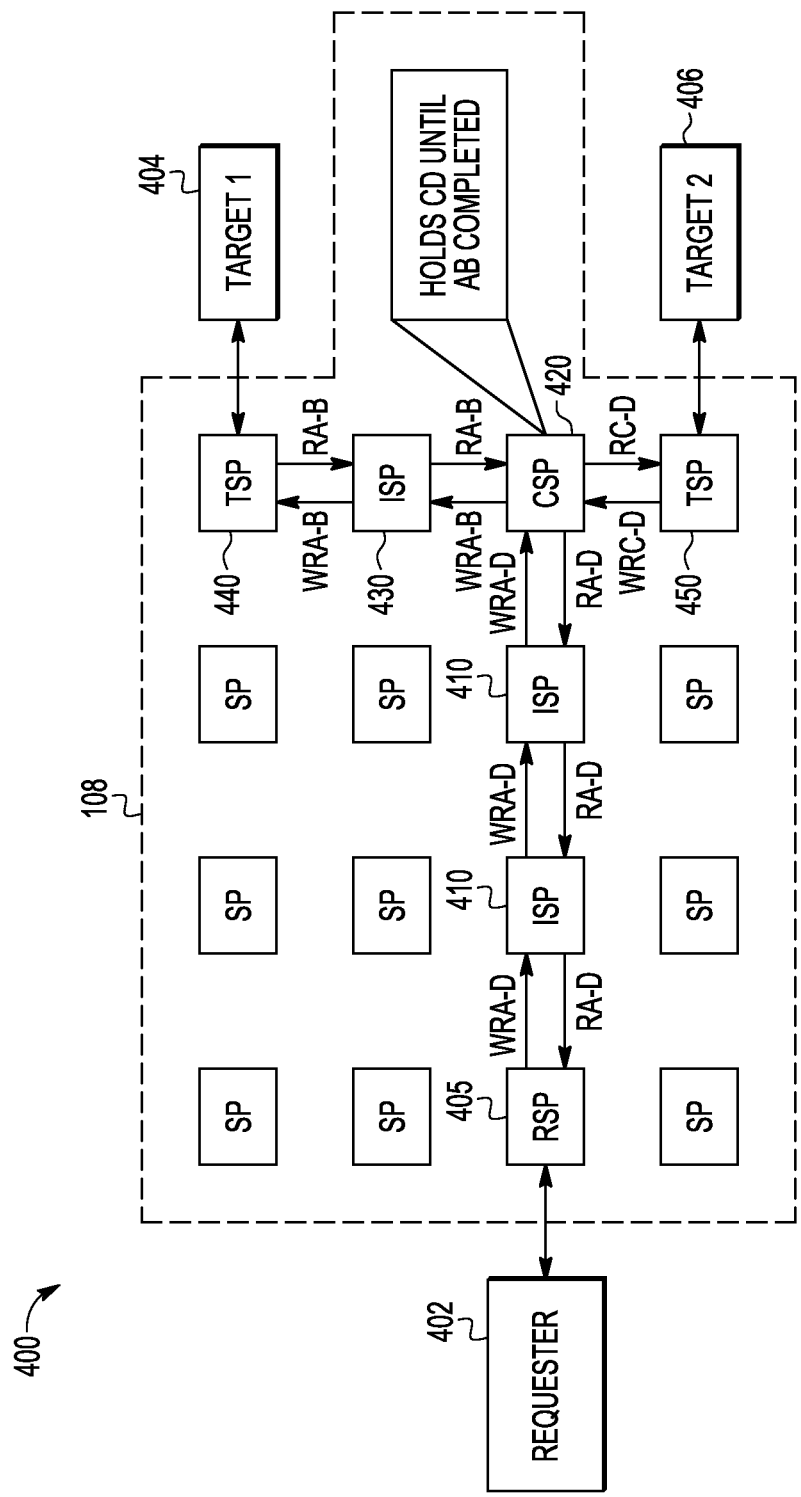
FIG. 4 is a block diagram of en example embodiment where a requester device is sending write requests that address a first target device and a second target device.

FIG. 4 is a block diagram of an example embodiment 400 where a requester device 402 is sending write requests that address a first target device 404 and a second target device 406. For this embodiment 400, it is assumed that a data block to be written has been split into four data parcels (A, B, C, D). Write requests for parcels A and B have the first target device 404 as the target device, and write requests for parcels C and D have the second target device 406 as the target device. Switch point 420 is located at a bifurcation point for the write requests and is operating as a controlling switch point (CSP). The requester switch point (RSP) 405 is connected to the requester device 402. Switch points 410 are intermediate switch points (ISPs) between the requester switch point (RSP) 405 and the controlling switch point (CSP) 420. Switch point 430 is an intermediate switch point (ISP) between the controlling switch point (CSP) 420 and the target switch point (TSP) 440 that is connected to the first target device 404. The target switch point (TSP) 450 is connected to the second target device 406 and is also connected to the controlling switch point (CSP) 420.

In operation, the requester device 402 sends the four write requests (WRA, WRB, WRC, WRD) for the four data parcels (A-D) to the requester switch point (RSP) 405 without waiting for any write completion responses. These write requests (WRA-D) are forwarded by the intermediate switch points (ISPs) 410 to the controlling switch point (CSP) 420. The controlling switch point (CSP) 420 holds the lower ordered write requests C and D (WRC-D) that have the second target device 406 as their target device. The controlling switch point (CSP) 420 sends the higher ordered write requests A and B (WRA-B) that have the first target device 404 as their target device to the target switch point (TSP) 440 for the first target device 404 through the intermediate switch point (ISP) 430. The intermediate switch point (ISP) 430 forwards the write requests A and B (WRA-B) to the target switch point (TSP) 440, and the target switch point (TSP) 440 in turn provides these write requests to the first target device 404.

Once the writes are completed for write requests A and B (WRA-B), the first target device 404 sends write completion responses A and B (RA-B) for each of these completed write requests to the target switch point (TSP) 440. The target switch point (TSP) 440 then sends the write completion responses A and B (RA-B) back to the requester device 402. The path for the write completion responses A and B (RA-B) is a reverse path from the write request path and will pass through the intermediate switch point (ISP) 430 and the controlling switch point (CSP) 420. The controlling switch point (CSP) 420 monitors the write completion responses on their way to the requester device 402 and identifies the last completion response (RB) for the last write request (WRB) to the first target 404. The controlling switch point (CSP) 420 then releases the lower ordered write requests C and D (WRC-D) for processing by the second target device 406 and sends the lower ordered write requests C and D (WRC-D) to the target switch point (TSP) 450 for the second target device 406. The target switch point (TSP) 450 in turn provides these write requests to the second target device 406. Once the writes are completed for these write requests C and D (WRC-D), the second target device 406 sends write completion responses C and D (RC-D) for these completed write requests to the target switch point (TSP) 450. The target switch point (TSP) 450 then sends the write completion response C and D (RC-D) back to the requester device 402. The path for these write completion responses C and D (RC-D) is a reverse path from the write request path and will pass through the controlling switch point (CSP) 420. The controlling switch point (CSP) 420 monitors the write completion responses on their way to the requester and identifies the last completion response (RD) for the last write request (WRD) to the second target 406.

It is noted that the requester switch point (RSP) 405 can accumulate multiple write complete responses and send a single write completion response back to the requester device 402. For example, the requester switch point (RSP) 405 can receive a single write request (e.g., 4 KB) from the requester device 402, and the requester switch point (RSP) 405 can break this write request into a number of different parceled write requests. Each of these parceled write requests are then forwarded through the switch point interconnect network 108. A write completion response is received for each of these parceled write requests from the appropriate target switch point (TSP). The requester switch point (RSP) 405 then aggregates the different write completion responses and provides a single write completion response back to the requester device 402 when all of the write completion responses have been received.

It is also noted that a controlling switch point (CSP) for the write transaction can be selected by determining the switch point 110 that requires the fewest hops to reach the target devices addressed by the write transaction. For embodiment 400, it is seen that switch point 420 is the switch point (SP) that requires the fewest hops to get to both target devices 402 and 404. As a controlling switch point (CSP), switch point 420 stops issuing write requests to target devices when a bifurcation in the target destination is detected for write requests received by the switch point 420. For example, write requests to the second target device 406 are held by controlling switch point (CSP) 420 until the first target device 404 returns its last write response. Additional write requests to the second target device 406 are then released by the controlling switch point (CSP) 420. As such, switching point 420 operates as a controlling switch point (CSP) for that write transaction. It is further noted that the controlling switch point (CSP) could be chosen in different ways, and multiple CSPs could also be utilized while still having the SP interconnect network 108 implement ordering rules thereby removing this responsibility from the requester devices 104. For example, multiple bifurcation points can be used within the SP interconnect network 108, and a switch point at each bifurcation point can then operate as a controlling switch point (CSP).

Figure 5:
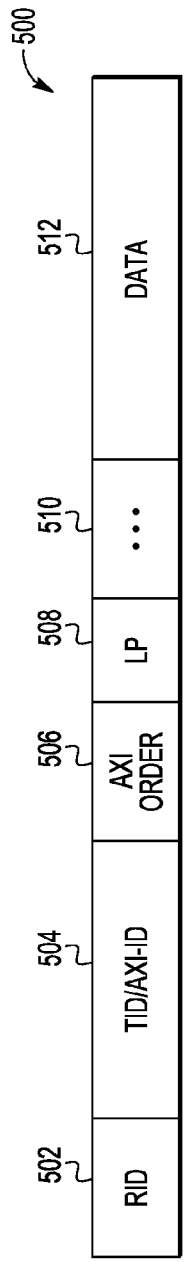
FIG. 5 is a diagram of an example embodiment for a write transaction request that can be sent by requester devices.

FIG. 5 is a diagram of an example embodiment 500 for a write transaction request that can be sent by requester devices 104. Field 502 includes a requester identifier (RID). Field 504 includes a transaction identifier that is treated as an AXI identifier (AXI-ID) if the AXI order bit 506 is set and as a non-AXI transaction identifier (TID) if the AXI order bit 506 is not set. If the AXI order bit 506 is set, then AXI ordering rules will be enforced. Field 508 is a last parcel (LP) bit that is set to indicate that the write transaction request is the last parcel of a stream of write requests and is not set otherwise. Field 512 represents the data for the write request. And field 510 represents other information and/or fields that can be included within the write request. Variations could also be implemented.

Figure 6:
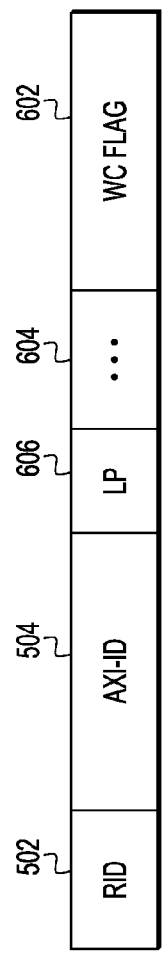
FIG. 6 is a diagram of an example embodiment for a write completion response that can be sent by target devices.

FIG. 6 is a diagram of an example embodiment 600 for a write completion response that can be sent by target devices 102. Field 502 includes the requester identifier (RID). Field 504 includes the AXI identifier (AXI-ID) for the target device. Field 602 includes a write completion (WC) flag to indicate that the write request has been completed by the target device. Field 606 is a last parcel (LP) bit that is set to indicate that the write transaction request associated with the write completion response was the last parcel of a stream of write requests. And field 604 represents other information and/or fields that can be included within the write completion response. Variations could also be implemented.

Figure 7:
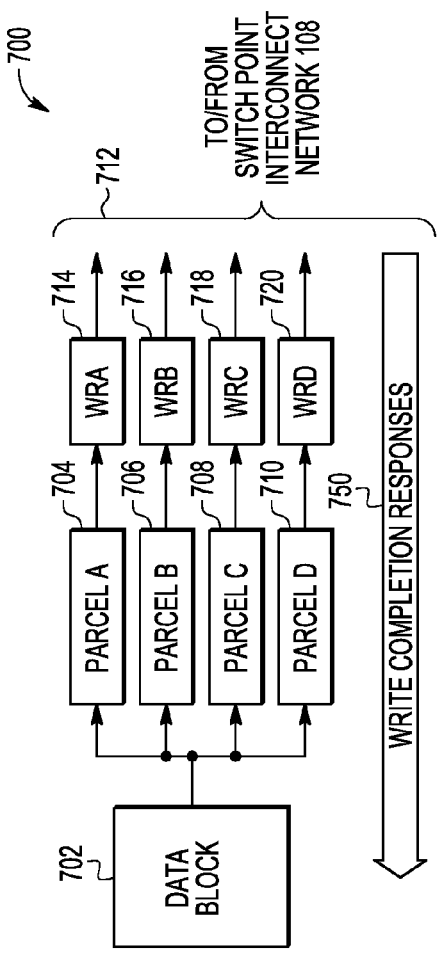
FIG. 7 is a block diagram of an example write data block that is broken into four parcels and placed into four ordered write requests by a requester device.

FIG. 7 is a block diagram 700 of an example write data block that is broken into four parcels and placed into four ordered write requests by a requester device 104. As depicted, data block 702 is broken into a first parcel (PARCEL A) 704, a second parcel (PARCEL B) 706, a third parcel (PARCEL C) 708, and a forth parcel (PARCEL D) 710. The first parcel (PARCEL A) 704 is the write data for a first write request (WRA) 714. The second parcel (PARCEL B) 706 is the write data for a second write request (WRB) 716. The third parcel (PARCEL C) 708 is the write data for a third write request (WRC) 718. And the forth parcel (PARCEL D) 710 is the write data for a fourth write request (WRD) 720. The four write requests 714, 716, 718, and 720 are sent to the switch point interconnect network 108 as indicated by bracket 712. It is again assumed that the write requests 714, 716, 718, and 720 are directed to multiple different target devices. As described above, at least one switch point (SP) within the SP interconnect network 108 operates as a controlling switch point (CSP) to control the flow of the write requests to the multiple target devices that are identified within the write requests. When each of these four write requests is completed, a completion response is sent back through the switch point interconnect network 108 to the requester device 104. As described above, the completion response for the last parcel in the series can be indicated by setting the LP bit 606, and the write completion responses 750 can be combined into a single combined write completion response before being provided back to the requester device 104.

In operation, therefore, the requester device 104 generates ordered write requests associated with the write data block 702 to be written to multiple target devices through an AXI interconnection provided by the SP interconnect network 108. For ordered AXI transactions, the AXI order bit 506 will be set. As such, field 504 is used as an AXI-ID for the target device, and the switch points 110 enforce AXI ordering of the write requests. If the AXI order bit 506 is not set, then field 504 is treated as a non-AXI transaction identifier (TID) for an independent non-ordered transaction, and AXI ordering is not enforced. As indicated above, write requests also include the requester ID (RID) 502 and include the LP bit 508 that indicates the last parcel in a series of ordered write requests.

As described above, each switch point 110 stores a transaction counter 304 for each active write transaction it processes. Within the each transaction counter 304, the switch point 110 stores the requester ID (RID) 306 and the transaction identifier (e.g., AXI-ID) 308 as a tuple that identifies the active transaction. Further, the direction 310 of the transaction is also stored such that the switch point 110 knows whether write requests are being sent from the requester device to the target device (X to Y) or write completion responses are being sent from the target device to the requester device (Y to X). The switch points 110 can store this information as a database record for each transaction counter 304, and this database can be stored in a data storage medium (e.g., database within dynamic random access memory) associated with the switch point 110. The switch points 110 can also use a data storage medium to store write requests, write completion responses, and/or other information as needed to facilitate the operation of the switch points 110 as described herein.

With respect to AXI transactions that use buffered writes and non-buffered writes, the requester devices 104 can be configured to change buffered writes into non-buffered writes setting the AXI order bit 506 and providing the AXI-ID in field 504 for the write requests. Target devices receiving non-buffered writes with the AXI order bit set and with the target device's AXI-ID are configured to return write completion responses (WRs) in the order that the write requests were received. Write completion responses are returned from the target device in the same order but in the opposite direction as the write request transaction flow through the switch points 110 within the SP interconnect network 108.

Where a write request controller 204 for a requester device 104 receives a buffered write transaction that accesses multiple targets, a write request controller 204 can issue a completion response and then carry out non-buffered writes to the SP interconnect network 108. In particular, the write data formatter 202 breaks large buffered writes (BWs) into interleaved granule boundary parceled non-buffered writes (pNBWs). Further, unaligned buffered writes are broken at interleave granule boundaries issuing an unaligned parceled non-buffered write up to the interleaved granule boundary. Write requests for the pNBW parcels are then issued into the SP interconnect network 108. The target device 102 then issues write completion responses (WRs) for each of the above pNBWs.

The write request issued for the last pNBW for a non-buffered writes in a series sets the last parcel (LP) bit 508. When a write request is completed, and the pNBW being responded to had the LP bit set, the target device also sets the LP bit 606 in the write completion response. A write completion response received by the requesting device 104 with an LP bit set corresponds to a completion of the pNBWs issued by the requester device. Where a write request controller 204 for a requester device 104 receives a non-buffered write (NBW) transaction, a write completion response is not sent until the NBW is completed in the system.

As described herein, a variety of embodiments can be implemented and different features and variations can be implemented, as desired.

For one embodiment, a method is disclosed to control ordered writes of data from a requester device to multiple target devices including generating a plurality of write requests for a plurality of parcels associated with a block of data to be written from a requester device to multiple target devices where the write requests having a particular order in which the parcels are to be written to the multiple target devices, sending the write requests to a network of a plurality of interconnected switch points in the particular order where the requester device and the multiple target devices being coupled to the plurality of interconnected switch points, and controlling flow of the write requests to the multiple target devices using at least one of the switch points such that the particular order is maintained.

In other embodiments, each write request includes a requester identifier field for the requester device, a transaction identifier field for the target device, and at least one order bit indicating whether the particular order is to be enforced. In further embodiments, the method includes storing a requester identifier and a transaction identifier for each of the write requests within the at least one switch point. In still further embodiments, the method includes holding one or more second write requests for a second target device until one or more first write requests for a first target device have completed if the particular order indicates that the second write requests are to occur after the first write requests.

In additional embodiments, the plurality of interconnected switch points are arranged in an array having a plurality of rows and a plurality of columns, and wherein each switch point is connected to switch points in adjacent rows and columns. Further, the requester device and each of the target devices can be coupled to a different switch point, and the at least one switch point includes a switch point within the plurality of switch points that has a least number of switch points between itself and the switch points coupled to the target devices. In additional embodiments, the target devices comprise memory devices, and wherein the particular order is based upon the AXI (Advanced eXtensible Interface) protocol.

In further embodiments, the method includes receiving write completion responses from the target devices when write requests are completed by the target devices. In addition, the method can include setting at least one bit in a last write request to indicate that it holds a last parcel in the particular order and setting at least one bit in a last write completion response to indicate that it is associated with the last parcel in the particular order. Still further, the method can include combining a plurality of write completion responses into a combined write complete response.

For another embodiment, an interconnect system is disclosed to control ordered writes of data from a requester device to multiple target devices including a plurality of interconnected switch points where at least one of the switch points is coupled to a requester device, at least one of the switch points is coupled to a first target device, and at least one of the switch points is coupled to a second target device. The interconnect system also includes at least one controlling switch point within the plurality of interconnected switch points and a controller within the controlling switch point. The controlling switch point is coupled to receive write requests for a plurality of parcels associated with a block of data to be written from the requester device to the first and second target devices, and the write requests have a particular order in which the parcels are to be written to the multiple target devices. The controller is coupled to receive the write requests and to control flow of the write requests to the first and second target devices such that the particular order is maintained.

In other embodiments, each write request includes a requester identifier field for the requester device, a transaction identifier field for the target device, and at least one order bit indicating whether the particular order is to be enforced. In further embodiments, the controlling switch point includes a plurality of transaction counters, and each transaction counter is configured to store a requester identifier and a transaction identifier for each of the write requests. In still further embodiments, the controlling switch point is coupled to receive one or more second requests for the second target device, to receive one or more first requests for the first target device, and to hold the second write requests until the first write requests have completed if the particular order indicates that the second write requests are to occur after the first write requests.

In additional embodiments, the plurality of switch points are arranged in an array having a plurality of rows and a plurality of columns, and wherein each switch point is connected to switch points in adjacent rows and columns. Still further, the requester device and the first and second target devices can be coupled to a different switch point, and the controlling switch point can include a switch point within the plurality of switch points that has a least number of switch points between itself and the switch points coupled to the target devices. In other embodiments, the first and second target devices include memory devices, and the particular order is based upon the AXI (Advanced eXtensible Interface) protocol In further embodiments, the controlling switch point can be configured to receive write completion responses from the first and second target devices when write requests are completed by the first and second target devices. In addition embodiments, at least one bit in the write requests is configured to indicate that it holds a last parcel in the particular order, and at least one bit in a last write completion response is configured to indicate that it is associated with the last parcel in the particular order. Still further, the least one of the switch point coupled to the requester device can be configured to receive the write completion responses and to combine them into a combined write complete response.

Unless stated otherwise, terms such as "first" and "second" are used to arbitrarily distinguish between the elements such terms describe. Thus, these terms are not necessarily intended to indicate temporal or other prioritization of such elements.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the invention is described herein with reference to specific embodiments, various modifications and changes can be made without departing from the scope of the present invention. Accordingly, the specification and figures are to be regarded in an illustrative rather than a restrictive sense, and such modifications are intended to be included within the scope of the present invention. Further, any benefits, advantages, or solutions to problems that are described herein with regard to specific embodiments are not intended to be construed as a critical, required, or essential feature or element of any or all the claims.

What is claimed is:

1. A method to control ordered writes of data from a requester device to multiple target devices, comprising:
generating a plurality of write requests for a plurality of parcels associated with a block of data to be written from a requester device to multiple target devices, the write requests having a particular order in which the parcels are to be written to the multiple target devices;
sending the write requests to a network of a plurality of interconnected switch points in the particular order, the requester device and the multiple target devices being coupled to the plurality of interconnected switch points; and
controlling flow of the write requests to the multiple target devices using at least one of the switch points such that the particular order is maintained, wherein each write request comprises a requester identifier field for the requester device, a transaction identifier field for the target device, and at least one order bit indicating whether the particular oder is to be enforced.

2. The method of claim 1, further comprising storing a requester identifier and a transaction identifier for each of the write requests within the at least one switch point.

3. The method of claim 1, wherein the controlling comprises holding one or more second write requests for a second target device until one or more first write requests for a first target device have completed if the particular order indicates that the second write requests are to occur after the first write requests.

4. The method of claim 1, wherein the plurality of interconnected switch points are arranged in an array having a plurality of rows and a plurality of columns, and wherein each switch point is connected to switch points in adjacent rows and columns.

5. The method of claim 4, wherein the requester device and each of the target devices are coupled to a different switch point, and wherein the at least one switch point comprises a switch point within the plurality of switch points that has a least number of switch points between itself and the switch points coupled to the target devices.

6. The method of claim 1, further comprising receiving write completion responses from the target devices when write requests are completed by the target devices.

7. The method of claim 6, further comprising combining a plurality of write completion responses into a combined write complete response.

8. The method of claim 1, wherein the target devices comprise memory devices, and wherein the particular order is based upon the AXI (Advanced eXtensible Interface) protocol.

9. A method to control ordered writes of data from a requester device to multiple target devices, comprising:
generating a plurality of write requests for a plurality of parcels associated with a block of data to be written from a requester device to multiple target devices, the write requests having a particular order in which the parcels are to be written to the multiple target devices;
sending the write requests to a network of a plurality of interconnected switch points in the particular order, the requester device and the multiple target devices being coupled to the plurality of interconnected switch points; and
controlling flow of the write requests to the multiple target devices using at least one of the switch points such that the particular order is maintained;
receiving write completion responses from the target devices when write requests are completed by the target devices; and
setting at least one bit in a last write request to indicate that it holds a last parcel in the particular order, and setting at least one bit in a last write completion response to indicate that it is associated with the last parcel in the particular order.

10. The method of claim 9, wherein the controlling comprises holding one or more second write requests for a second target device until one or more first write requests for a first target device have completed if the particular order indicates that the second write requests are to occur after the first write requests.

11. The method of claim 9, wherein the plurality of interconnected switch points are arranged in an array having a plurality of rows and a plurality of columns, and wherein each switch point is connected to switch points in adjacent rows and columns.

12. The method of claim 9, wherein the target devices comprise memory devices, and wherein the particular order is based upon the AXI (Advanced eXtensible Interface) protocol.

13. An interconnect system to control ordered writes of data from a requester device to multiple target devices, comprising:
a plurality of interconnected switch points, at least one of the switch points being coupled to a requester device, at least one of the switch points being coupled to a first target device, and at least one of the switch points being coupled to a second target device;
at least one controlling switch point within the plurality of interconnected switch points coupled to receive write requests for a plurality of parcels associated with a block of data to be written from the requester device to the first and second target devices, the write requests having a particular order in which the parcels are to be written to the multiple target devices; and
a controller within the controlling switch point coupled to receive the write requests and to control flow of the write requests to the first and second target devices such that the particular order is maintained, wherein each write request comprises a requester identifier field for the requester device, a transaction identifier field for the target device, and at least one order bit indicating whether the particular order is to be enforced.

14. The interconnect system of claim 13, further comprising a plurality of transaction counters within the controlling switch point, each transaction counter being configured to store a requester identifier and a transaction identifier for each of the write requests.

15. The interconnect system of claim 13, wherein the controller within the controlling switch point is coupled to receive one or more second requests for the second target device, to receive one or more first requests for the first target device, and to hold the second write requests until the first write requests have completed if the particular order indicates that the second write requests are to occur after the first write requests.

16. The interconnect system of claim 13, wherein the plurality of switch points are arranged in an array having a plurality of rows and a plurality of columns, and wherein each switch point is connected to switch points in adjacent rows and columns.

17. The interconnect system of claim 16, wherein the requester device and the first and second target devices are coupled to a different switch point, and wherein the controlling switch point comprises a switch point within the plurality of switch points that has a least number of switch points between itself and the switch points coupled to the target devices.

18. The interconnect system of claim 13, wherein the controlling switch point is further configured to receive write completion responses from the first and second target devices when write requests are completed by the first and second target devices.

19. The interconnect system of claim 18, wherein the least one of the switch point coupled to the requester device is configured to receive the write completion responses and to combine them into a combined write complete response.

20. The interconnect system of claim 13, wherein the first and second target devices comprise memory devices, and wherein the particular order is based upon the AXI (Advanced eXtensible Interface) protocol.

21. An interconnect system to control ordered writes of data from a requester device to multiple target devices, comprising:
a plurality of interconnected switch points, at least one of the switch points being coupled to a requester device, at least one of the switch points being coupled to a first target device, and at least one of the switch points being coupled to a second target device;
at least one controlling switch point within the plurality of interconnected switch points coupled to receive write requests for a plurality of parcels associated with a block of data to be written from the requester device to the first and second target devices, the write requests having a particular order in which the parcels are to be written to the multiple target devices; and
a controller within the controlling switch point coupled to recieve the write requests and to control flow of the write requests to the first and second target devices such the the particular order is maintained;
wherein the controlling switch point is further configured to received write completion responses from the first and second target devices when write requests are completed by the first and second target devices, and, wherein at least one bit in the write requests is configured to indicate that it holds a last parcel in the particular order, and wherein at least one bit in a last write completion response is configured to indicate that it is associated with the last parcel in the particular order.

22. The interconnect system of claim 21, wherein the controllor within the controlling switch point is coupled to receive one or more second requests for the second target device, to receive one or more first requests for the first target device, and to hold the second write requests until the first write requests have completed if the particular order indicates that the second write requests are to occur after the first write requests.

23. The interconnect system of claim 21, wherein the plurality of switch points are arranged in an array having a plurality of rows and a plurality of columns, and wherein each switch point is connected to switch points in adjacent rows and columns.

24. The interconnect system of claim 21, wherein the first and second target devices comprise memory devices, and wherein the particular order is based upon the AXI (Advanced eXtensible Interface) protocol.

* * * * *